The foregoing description and accompanying drawings set forth in detail mechanism in embodiment of my invention. Change may be made therein, provided the principles of construction respectively recited in the following claims are employed.

I therefore particularly point out and distinctly claim as my invention—

1. The combination, with an open-top guide-box, of a guide seated therein, substantially as set forth.

2. The combination, with an open guide-box and a guide fitting therein, of a detachable fastening connecting the two together, substantially as set forth.

3. The combination, with an open guide-box and a guide fitting therein, of a frictional fastening connecting the two together, substantially as set forth.

4. The combination, with an open guide-box and a guide fitting therein, of a wedge detachably fitted between adjacent walls of said guide and guide-box, substantially as set forth.

In testimony that I claim the foregoing to be my invention I have hereunto set my hand this 20th day of November, A. D. 1888.

PATRICK L. DAY.

Witnesses:
THOS. B. HALL,
J. B. FAY.